(12) United States Patent
Xu et al.

(10) Patent No.: US 12,043,546 B2
(45) Date of Patent: Jul. 23, 2024

(54) METHODS FOR PREPARING AEROGELS BY PLASTICIZING AND FOAMING WITH SOLVENTS

(71) Applicant: ZHEJIANG UNIVERSITY, Hangzhou (CN)

(72) Inventors: Zhen Xu, Hangzhou (CN); Kai Pang, Hangzhou (CN); Chao Gao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 349 days.

(21) Appl. No.: 17/428,639

(22) PCT Filed: Mar. 12, 2020

(86) PCT No.: PCT/CN2020/078904
§ 371 (c)(1),
(2) Date: Aug. 5, 2021

(87) PCT Pub. No.: WO2021/179232
PCT Pub. Date: Sep. 16, 2021

(65) Prior Publication Data
US 2022/0306473 A1    Sep. 29, 2022

(51) Int. Cl.
*C01B 32/184* (2017.01)
*B01J 13/00* (2006.01)
*C01B 32/198* (2017.01)

(52) U.S. Cl.
CPC ......... *C01B 32/184* (2017.08); *B01J 13/0091* (2013.01); *C01B 32/198* (2017.08)

(58) Field of Classification Search
CPC ... C01B 32/182; C01B 32/184; C01B 32/198; B01J 13/0091; C01G 39/06
See application file for complete search history.

(56) References Cited

U.S. PATENT DOCUMENTS

2019/0010060 A1* 1/2019 Oh .................. F16L 59/028

FOREIGN PATENT DOCUMENTS

CN        109096526 A  * 12/2018    ........... C01B 32/198

OTHER PUBLICATIONS

Joshi, Mahesh Kumar, et al. "Multi-layered macroporous three-dimensional nanofibrous scaffold via a novel gas foaming technique." Chemical Engineering Journal 275 (2015): 79-88.*
Krittayavathananon, Atiweena, and Montree Sawangphruk. "Impedimetric sensor of ss-HSDNA/reduced graphene oxide aerogel electrode toward aflatoxin B1 detection: effects of redox mediator charges and hydrodynamic diffusion." Analytical chemistry 89.24 (2017): 13283-13289.*

(Continued)

*Primary Examiner* — Richard M Rump (57) ABSTRACT

The present invention provides a method for preparing an aerogel based on plasticizing and foaming with solvent, and the aerogel material is prepared through plasticization with solvent and generation of in-situ bubbles. The method solves the difficult problem that the non-polymer is difficult to realize thermoplastic foaming, and has wide applicability. In addition, a lot of foaming agents can be uses for this method, and this method is easy to implement, and does not require a special drying process, so that the industrialization development of the porous aerogel is greatly promote.

6 Claims, 4 Drawing Sheets

(56) References Cited

OTHER PUBLICATIONS

Zhang, Hui, et al. "Versatile fabrication of a superhydrophobic and ultralight cellulose-based aerogel for oil spillage clean-up." Physical Chemistry Chemical Physics 18.40 (2016): 28297-28306.*

Zhang, Hongyuan, et al. "Super light 3D hierarchical nanocellulose aerogel foam with superior oil adsorption." Journal of colloid and interface science 536 (2019): 245-251.*

* cited by examiner

METHODS FOR PREPARING AEROGELS BY PLASTICIZING AND FOAMING WITH SOLVENTS

TECHNICAL FIELD

The invention relates to the technical field of functional materials, in particular, to methods for preparing aerogels by plasticizing and foaming with solvents.

BACKGROUND

Thermoplastic foams are widely used in daily life, such as for damping, heat insulation, package, sports protection and the like, due to their excellent properties such as ultra-light weight, insulation and antifatigue, etc. The thermoplastic foaming process mainly includes permeating gas by disentanglement of the molecular chains of the polymer at a high temperature, and fixing the foam cells generated by the gas into the polymer through low temperature setting, so as to obtain the thermoplastic foams. However, the existing thermoplastic foaming processes are only applicable to polymer material, such as polyurethanes, polypropylenes, etc., which can be plasticized at relatively low temperatures, whereas the existing thermoplastic process may be applicable to carbon materials, inorganic materials, metallic materials, etc, which have extremely high plasticizing temperatures (up to 3000 Celsius degrees), provided that an extremely high energy is supplied.

Aerogels are porous materials with low density generally prepared by a specific drying method from wet gels. The earliest aerogel is a silica aerogel prepared by Kistler, which is the solid with the lowest density in the world. In current, there are many kinds of aerogels, mainly including carbon materials, inorganic materials and metal materials that cannot be obtained by thermoplastic foaming process. However, in current, aerogels are mainly obtained by supercritical drying or freeze drying, which requires high energy consumption, and the structures of the resulted aerogels are unstable, and thus is not favorable for large-scale industrial disclosure.

It should be noted that the above information disclosed in the background is merely intended for an easy understanding of the general background of the invention, and should not be construed as acknowledging or implying in any way that the above information constitutes prior art well known to those of ordinary skill in the art.

SUMMARY

An object of the present invention is to provide a method for preparing an aerogel material by plasticizing and foaming with solvent, which mainly combines plasticization with solvent with generation of in-situ bubbles, so as to obtain the aerogel material. This method is different from the existing thermoplastic foaming, in this method, plasticizer, in a solution, penetrates into an assembled macroscopical material to reduce the intermolecular force inside the assembled material and reduce the foaming resistance, and at the same time, an in-situ foaming can be realized based on the foaming agent, thereby obtaining the aerogel material, so that the foaming problem of the non-thermoplastic polymer can be solved.

Another object of the present invention is to provide a method for preparing an aerogel material by plasticizing and foaming with solvent, which mainly combines plasticization with solvent with generation of in-situ bubbles, so as to obtain the aerogel material. This method is different from the existing thermoplastic foaming, in this method, plasticizer, in a solution, penetrates into an assembled macroscopical material to reduce the intermolecular force inside the assembled material to perform the in-situ foaming. As can be seen that, the method controls the structure at the molecular level in nano size, and can control the wall thickness, pore size and the like of the aerogel microcosmically.

Another object of the present invention is to provide a method for preparing a porous aerogel material by plasticizing and foaming with solvent, which mainly combines plasticization with solvent with generation of in-situ bubbles, thereby obtaining an aerogel material. In this method, heat treatment is not need, and energy consumption can be reduced.

Any of the above objects can be achieved by: (1) mixing a material to be foamed with a foaming agent precursor, assembling the resulted mixture into a macroscopical material; and placing the macroscopical material into a plastic solution to be plasticized and foamed, and then dried to obtain the aerogel material; or (2) assembling a material to be foamed into a macroscopical material; and placing the macroscopical material into a plastic solution containing a foaming agent to be plasticized and foamed, and then dried to obtain the aerogel material.

Methods (1) and (2) are substantially the same and both of them include plasticizing and foaming, and the difference between them relies in the foaming method. In the method (1), before assembly, the foaming agent precursor is added, and then the foaming is initiated in the plastic solution, while in the method (2), the assembled material is directly used to be initiated in the plastic solution to foam.

The plastic solution is a plasticizer or a solution containing the plasticizer. Therefore, in the present disclosure, the plasticizer can be used as a solvent or as a solute together with the foaming initiator.

The plasticizer is a substance which can reduce the intermolecular force of the material to be foamed, and the substance which reduces the intermolecular force inside the film is usually a substance having affinity with the material, for example, cellulose with polar solvent (water, DMF, DMSO, etc.); silver nanowire with surfactant, wherein the surfactant can reduce the surface tension of the silver nanowire (the HLB values of silver nanowire and surfactant are close to each other); Mxene with dimethyl pyrrolidone, polyethylene glycol; molybdenum disulfide and dimethyl pyrrolidone; polyethylene glycol; graphene and dimethylformamide, dimethylacetamide, isopropanol, ethanol, and the like.

For the method (1), a method of initiating foaming of the foaming agent precursor includes, but is not limited to: adding an initiator, heating; wherein the initiator initiates the foaming agent precursor to produce gas. The foaming initiator and the foaming agent precursor can be combined in any form, such as, carbonate and acid, sodium borohydride and water, and the like. In the case where the foaming agent precursor is initiated to foam by heating, the added foaming agent precursor is a substance which can generate gas under heating condition, such as sodium bicarbonate.

For the method (2), the foaming agent comprises a spontaneous foaming agent and a reactive foaming agent, wherein the reactive foaming agent is a foaming agent that can generate gas by reacting with the material to be foamed, and the spontaneous foaming agent is a foaming agent that can be decomposed to generate gas, such as bicarbonate.

In the above methods, the drying may be performed in any form, such as direct drying, solvent-displacement drying, or the like. In certain preferred embodiments, energy consumption may be reduced by direct drying.

Based on the above methods, the invention is applicable for the foaming of all materials, in particular the non-thermoplastic polymers, such as graphene, molybdenum disulfide, Mxene, cellulose, silver nanowires and the like.

In some preferred embodiments, graphene aerogels are prepared using either method (1) or method (2) described above.

The purpose is to foam the assembled grapheme-based dense material by the action of gas and liquid, so as to obtain the highly porous graphene aerogel material.

Another object is to plasticize and foam the assembled graphene-based dense material mainly by the action of gas and liquid, in which the polar solution reduces the action force between layers of the graphene oxide so as to reduce foaming resistance. Because the dense graphene-based material generally has a layer-by-layer contacted structure, the internal pores of the graphene aerogel obtained by foaming are mostly contacted and overlapped with each other face-to-face, with relatively excellent mechanical properties.

Another object is to transform dense macroscopical material assembled from graphene oxide, such as one-dimensional fiber, two-dimensional film, etc., into three-dimensional porous aerogel material by means of plasticizing and foaming with liquid. The resulted aerogels are controllable in shape and pattern, easy to process, and the structure of the resulted aerogels is dependent with the dense macroscopical material, so that the aerogel has a certain structural controllability, which can be used in various fields of daily life, such as sound insulation, heat insulation, damping, absorption and electromagnetic shielding, etc.

In order to achieve the above objects, the following technical solution is adopted:

Method (1), mixing graphene oxide with a foaming agent precursor, forming a film, placing the film in a plastic solution to be plasticized and foamed, and then dried to obtain the porous graphene aerogel material.

As mentioned above, the method of initiating foaming of the foaming agent precursor in the plastic solution includes at one of adding an initiator, and heating.

Method (2), placing a macroscopical material, formed by stacking and assembling layers of graphene oxides, into a plastic solution contain a foaming agent for plasticizing and foaming, and then dried to obtain porous graphene aerogel material.

As mentioned above, the foaming agent includes a spontaneous foaming agent and a reactive foaming agent, wherein the reactive foaming agent is a foaming agent capable of generating gas by reacting with oxygen containing functional groups of the graphene oxide, such as hydrazine hydrate, borohydride salt; and the spontaneous foaming agent is a foaming agent that can be decomposed to generate gas, such as bicarbonate.

In some preferred embodiments, the macroscopical graphene oxide material may be formed by stacking and assembling layers of graphene oxide having a size greater than 1 μm, which, after plasticizing and foaming by the methods described herein, has higher expansion ratio and better structural integrity.

Such graphene oxide having an average size of no less than 1 can be prepared by the Hummers method and modified Hummers method and the like.

In some embodiments, the resulting graphene aerogel may have a volume expansion of 10-800 times the original macroscopical material, which has great potential application value in the fields of sound insulation, heat insulation, damping, absorption and electromagnetic shielding and the like.

In some preferred embodiments, the above-described method (1) or method (2) is used to prepare graphene aerogel for electromagnetic shielding, which is an aerogel material obtained by transforming a film, assembled from large-scale graphene oxide, into a three-dimensional porou aerogel material by foaming using plastic liquid. The resulted aerogel is controllable in shape and pattern, easy to process, and is applicable for use in the field of electromagnetic shielding due to its structure of highly oriented layer-by-layer arrangement, with an excellent shielding effect. In addition, the density of the aerogel is extremely low, which provides the possibility for the development of the fabrication of integrated micro-nano devices. The specific method can be as follows:

Graphene oxide with a size greater than 20 μm and a carbon to oxygen ratio greater than 2 is used to form a film, which is then soaked in a plastic solution containing a foaming agent, and the plastic solution is replaced with a volatile solvent, and then a drying process is performed to remove the volatile solvent to obtain a porous graphene material. A high-temperature annealing treatment is carried out on the porous graphene material to reduce the defect density, with an $I_D/I_G$ value of 0.01 to 1, thereby obtaining an electromagnetic shielding graphene material.

As described above, the plastic solution is a plasticizer or a solution containing the plasticizer. Therefore, the plasticizer may be used as a solvent or as a solute together with the foaming initiator. The plasticizer may be water, an organic solvent, or a mixed solution of water and organic solvent.

As described above, the foaming agent may be a solution of hydrazine hydrate, borohydride salt, bicarbonate, or the like that generates gas.

The temperature range of the high-temperature annealing treatment is 500-3000 Celsius degrees.

DESCRIPTION OF THE EMBODIMENTS

Hereinafter, the present invention will be further described with reference to examples, while the scope of the present invention is not limited thereto.

Example 1

Figure 1:
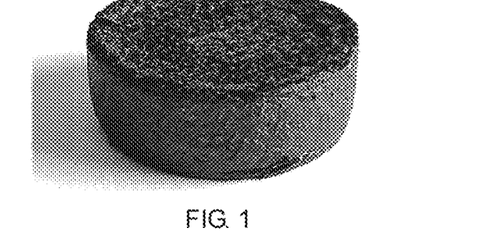
FIG. 1 shows a porous Mxenes aerogel material obtained from Example 1.

An aqueous suspension of 5 mg/ml Mxenes was uniformly mixed with sodium bicarbonate (with a mass ratio of Mxnes to sodium bicarbonate being 1:1), dried to form a film, and then placed in 10% of hydrochloric acid to generate bubbles for 1 min, thereby obtaining porous Mxenes aerogel, as shown in FIG. 1, which has a wall thickness of 195 nm, an average pore diameter of 100 μm, and a density of 11 mg/cm$^3$.

Example 2

Figure 2:
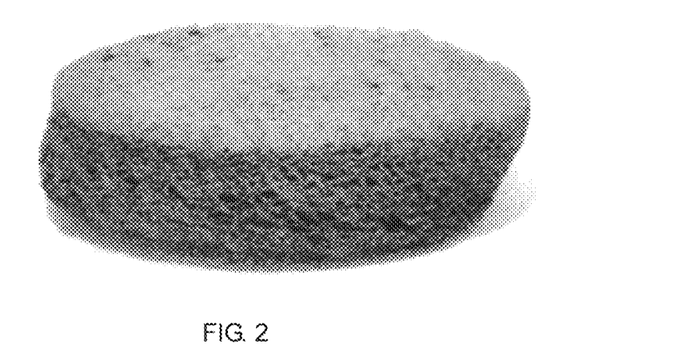
FIG. 2 shows a porous molybdenum disulfide aerogel material obtained from Example 2.

An aqueous suspension of 5 mg/ml molybdenum disulfide was uniformly mixed with sodium bicarbonate (with a mass ratio of molybdenum disulfide to sodium bicarbonate being 1:1), dried to form a film, and then placed in 10% of hydrochloric acid to generate gas foaming for 5 minutes, thereby obtaining porous molybdenum disulfide aerogel, as shown in FIG. 2, which has a wall thickness of 105 nm, an average pore diameter of 87 μm, and a density of 15 mg/cm$^3$.

Example 3

Figure 3:
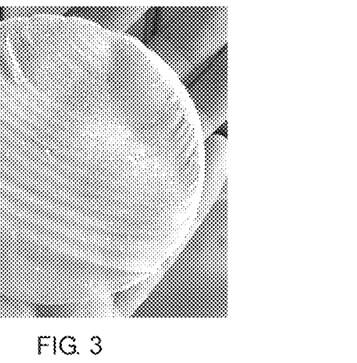
FIG. 3 shows a porous cellulose aerogel material obtained from Example 3.

An aqueous suspension of 11 mg/ml bacterial cellulose was uniformly mixed with sodium carbonate (with a mass ratio of bacterial cellulose to sodium bicarbonate being: 1:5), dried to form a film, and then placed in 15% of hydrochloric acid to generate gas foaming for 1 min, thereby Obtaining porous cellulose aerogel, as shown in FIG. 3, which has a wall thickness of 360 nm, an average pore diameter of 230 μm, and a density of 35 mg/cm$^3$.

Example 4

Figure 4:
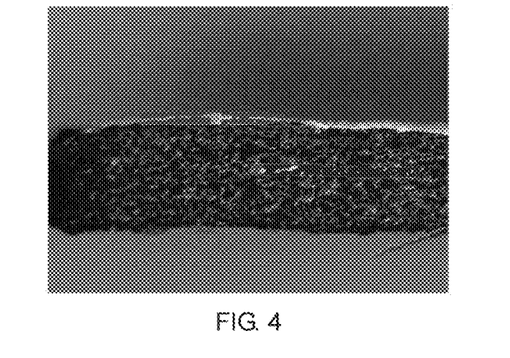
FIG. 4 shows a porous graphene aerogel material obtained from Example 4.

A suspension of 8 mg/nil graphene oxide was uniformly mixed with sulfuric acid which has an equal mass therewith, dried to form a film, and then placed in 10% of sodium bicarbonate solution to generate gas foaming for 1 min, thereby obtaining porous graphene aerogel, as shown in FIG. 4, which has a wall thickness of 50 nm, an average pore diameter of 310 μm, and a density of 12 mg/cm$^3$.

Example 5

Figure 5:
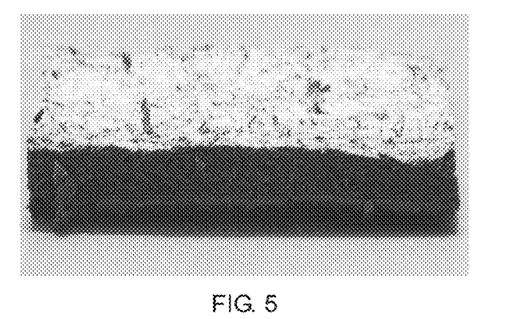
FIG. 5 shows a porous graphene aerogel material obtained from Example 2.

A suspension of 8 mg/nil graphene oxide was uniformly mixed with sulfuric acid which has an equal mass therewith, dried to form a film, and then placed in an aqueous solution containing 1% of sodium borohydride and DMF, wherein the volume ratio of DMF to water was 1:1, to generate gas foaming for 10 min, thereby obtaining porous graphene aerogel, as shown in FIG. 5, which has a wall thickness of 30 nm, an average pore diameter of 350 μm, and a density of 11 mg/cm$^3$.

Example 6

Figure 6:
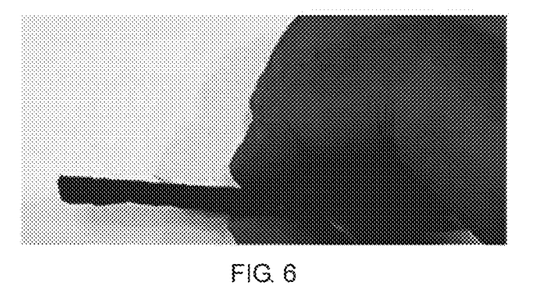
FIG. 6 shows a porous Mxenes aerogel material obtained from Example 2.

An aqueous suspension of 5 mg/ml Mxenes was uniformly mixed with sodium bicarbonate (with a mass ratio of Mxnes to sodium bicarbonate being 1:1) dried to form a film, and then placed in water and heated at 40 Celsius degrees to generate bubbles for 1 min, thereby obtaining porous Mxenes aerogel, as shown in FIG. 6, which has a wall thickness of 207 nm, an average pore diameter of 122 μm, and a density of 25 mg/cm$^3$.

Example 7

Figure 7A:
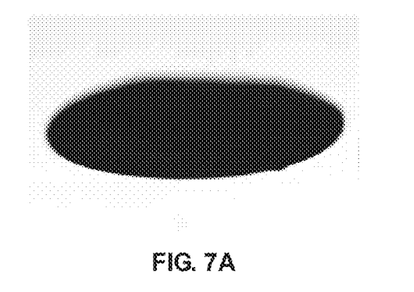
FIGS. 7A and 7B show a dense macroscopical graphe e oxide film material used in Example 7 and the resulting aerogel material respectively.
Figure 7B:
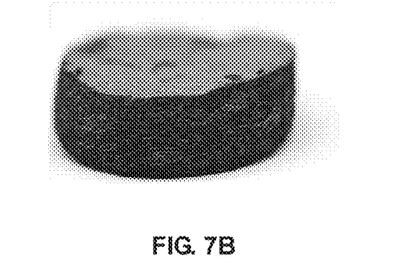

A suspension of 5 mg/ml graphene oxide (GO, available from Hangzhou Gaoxi Technology Co., LTD., with a size of 500 to 800 nm) was cast to obtain a graphene oxide film with a thickness of about 20 μm, which was cut into a disc and then placed in 10 wt % of aqueous solution of hydrazine hydrate for 5 minutes, thereby obtaining graphene aerogel having a height of about 8 mm.

The foamed graphene aerogel was soaked in water for 15 min to replace the foaming agent solution, and then dried under atmospheric pressure to remove the volatile solvent, thereby obtaining porous graphene aerogel with a density of about 5 mg/cm$^3$.

Compression test was carried out on the prepared aerogel using a compression tester, and it was found that the residual stress of the prepared aerogel after 10000 times of 90% strain compression was 85% of the initial stress and the plastic deformation was 15%.

Example 8

Figure 8A:
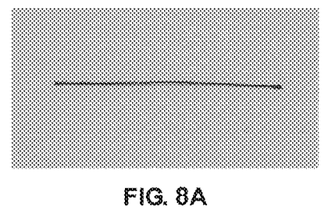
FIGS. 8A and 8B show a dense macroseopical graphene oxide film material used in Example 8 and the resulting aerogel material. respectively.
Figure 8B:
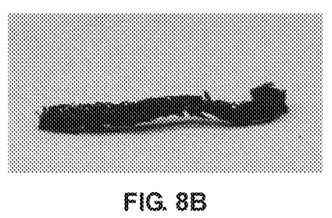

A suspension of 5 mg/ml graphene oxide (GO, available from Hangzhou Gaoxi Technology Co., LTD., with a size of 50 to 100 μm) was suffered from wet spinning to obtain a graphene oxide fiber with a diameter of 31.4 μm, which was then placed in 85 wt % of aqueous solution of hydrazine hydrate for 60 minutes, thereby obtaining highly entangled graphene fiber aerogel.

The foamed graphene aerogel was soaked in the volatile solvent, i.e., n-hexane, for 15 min to replace the foaming agent solution, and then directly dried to remove the volatile solvent, thereby obtaining porous graphene aerogel with a density of about 3 mg/cm$^3$.

Tensile test was carried out on the prepared aerogel using a tensile tester, and it was found that the prepared aerogel has an elongation at break of about 6%, and can be repeatedly tensed under 5% strain for 1000 times without breaking.

Example 9

At −10 Celsius degrees, 5 g of potassium permanganate was slowly added into 40 ml of concentrated sulfuric acid which was being rapidly stirred, after the mixture was fully dissolved, 1 g of graphite with particle size of 300 μm was added therein and was slowly stirred at 60 r/min for 2 h, and then the stilling was stopped and the reaction was kept at a low temperature of 10 Celsius degrees for 18 h to obtain a broad distribution of graphite oxide crystal; the resulted solution was diluted with concentrated sulfuric acid and filtered with a titanium alloy mesh screen having a pore size of 150 μm to obtain the graphite oxide crystal (with the solution retrieved), which was then slowly poured into ice water that was being rapidly stirred and had a volume of 10 times the filtered product, and then the mixture was stood for 2 hours, and was slowly added with $H_2O_2$ to remove excess potassium permanganate, and was added with appropriate amount of hydrochloric acid until the flocculent graphite oxide disappeared, and was then filtered by titanium alloy mesh screen to obtain graphite oxide crystal plates; the graphite oxide crystal plates were then shaken and washed slowly with a shaker to obtain a large piece of graphene oxide without fragment, which has been test with an average size of 10 μm and a distribution coefficient of 0.5, and C/O ratio of 1.7.

A suspension of 10 mg/ml graphene oxide was prepared and was suffered from suction filtration to prepare a graphene oxide non-woven fabric with a thickness of 20 μm, which was then placed in an aqueous solution of 100 mg/mL ammonium bicarbonate for reaction for 20 minutes at 60 Celsius degrees, thereby obtaining graphene aerogel having a height of about 7 mm.

The foamed graphene aerogel was soaked in the volatile solvent, cyclohexane, for 15 min to replace the foaming agent solution, and then directly dried to remove the volatile solvent, thereby obtaining porous grapheme aerogel with a density of about 2.4 mg/cm$^3$.

Compression test was carried out on the prepared aerogel using a compression tester, and it was found that the residual stress of the prepared aerogel after 50000 times of 90% strain compression was 95% of the initial stress and the plastic deformation was 5%.

Example 10

At −10 Celsius degrees, 5 g of potassium permanganate was slowly added into 30 ml of concentrated sulfuric acid which was being rapidly stirred, after the mixture was fully dissolved, 1 g of graphite with particle size of 2 mm was added therein and was slowly stirred at 60 r/min for 2 h, and then the stirring was stopped and the reaction was kept at a low temperature of 20 Celsius degrees for 48 h to obtain a broad distribution of graphite oxide crystal; the resulted solution was diluted with concentrated sulfuric acid and filtered with a titanium alloy mesh screen having a pore size of 150 to obtain the graphite oxide crystal (with the solution retrieved), which was then slowly poured into ice water that was being rapidly stirred and had a volume of 10 times the filtered product, and then the mixture was stood for 2 hours, and was slowly added with $H_7O_2$ to remove excess potassium permanganate, and was added with appropriate amount of hydrochloric acid until the flocculent graphite oxide disappeared, and was then filtered by titanium ahoy mesh screen to obtain graphite oxide crystal plates; the graphite oxide crystal plates were then shaken and washed slowly with a shaker to obtain a large piece of graphene oxide without fragment, which has been test with an average size of 108 μm and a distribution coefficient of 0.2, and C/O ratio of 3.1.

A suspension of 10 mg/mi graphene oxide was prepared and was cast to prepare a graphene oxide film with a thickness of 20 μm, which was then placed in an aqueous solution of 10 mg/mL sodium borohydride for reaction for 20 minutes, thereby obtaining graphene aerogel having a height of about 6.5 mm.

The foamed graphene aerogel was soaked in the volatile solvent, i.e., acetone, for 15 min to replace the foaming agent solution, and then directly dried to remove the volatile solvent, thereby obtaining a porous graphene aerogel with a density of about 5.9 mg/cm$^3$.

Compression test was carried out on the prepared aerogel using a compression tester, and it was found that the residual stress of the prepared aerogel after 10000 times of 90% strain compression was 98% of the initial stress and the plastic deformation was 2%.

Example 11

At −10 Celsius degrees, 5 g of potassium permanganate was slowly added into 30 ml of concentrated sulfuric acid which was being rapidly stirred, after the mixture was fully dissolved, 1 g of graphite with particle size of 2 mm was added therein and was slowly stirred at 60 r/min for 2 h, and then the stirring was stopped and the reaction was kept at a temperature of 20 Celsius degrees for 6 h to obtain graphene oxide, which has been test with an average size of 47 μm and a distribution coefficient of 0.5, and (70 ratio of 4.2.

A suspension of 10 mg/ml graphene oxide was prepared, and was cast to prepare a graphene oxide film with a thickness of about 20 μm.

Sodium borohydride with a mass/volume ratio of 80 mg/ml was added to a mixture of water and dimethylformamide with a volume ratio of 1:1, thereby obtaining foaming agent solution.

The graphene oxide film was placed in the foaming agent solution for 20 minutes, thereby obtaining graphene aerogel having a height of about 6.5 mm.

The foamed graphene aerogel was directly dried to remove the volatile solvent to obtain porous graphene aerogel with a density of about 5.9 mg/cm$^3$.

Compression test was carried out on the prepared aerogel using a compression tester, and it was found that the residual stress of the prepared aerogel after 10000 times of 90% strain compression was 97% of the initial stress and the plastic deformation was 3%.

Example 12

Figure 9A:
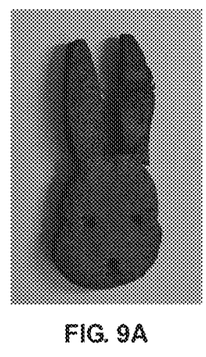
FIGS. 9A 9C show aerogels of different shapes Obtained from Example 1Z respectively.
Figure 9B:
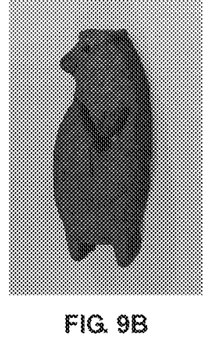
Figure 9C:
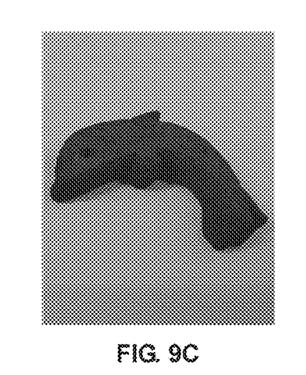

The materials and method used in this example were the same as those in Example 7, and this example differs from Example 7 in that the graphene oxide film was cut into different shapes, such as the shape of rabbit, bear, dolphin, and was foamed by liquid to obtain highly porous aerogel with special shapes, with a density of about 5-6 mg/cm$^3$.

Example 13

Figure 10:
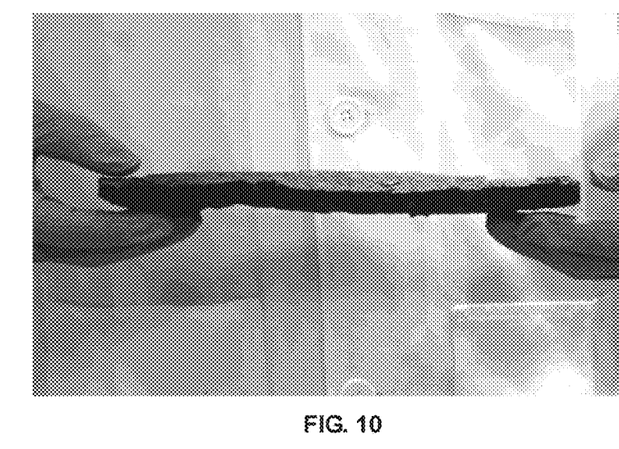
FIG. 10 shows a large-scale aerogel obtained from Example 13.
Figure 11:
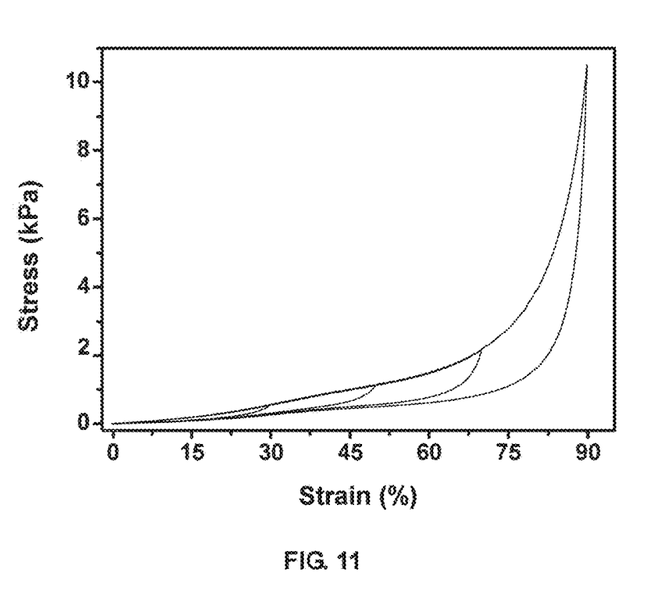
FIG. 11 is a graph of the compression of the aerogel matetial obtained from Example 10 under different compressive deformations.

The materials and method used in this example were the same as those in Example 7, and this example differs from Example 7 in that a sheet of graphene oxide film having a size of 25*25 cm was prepared, and was foamed by liquid to obtain highly porous and large-scale graphene aerogel, with a density of about 5 mg/cm$^3$. As can be seen that, the plasticizing and foaming method disclosed herein is applicable for large-scale preparation.

Example 14

A suspension of graphene oxide, having a size ranging from 20 to 30 μm, a carbon to oxygen ratio of 2.5, and a concentration of 5 mg/ml, available from Hangzhou Gaoxi Co., LTD., was cast to obtain a graphene oxide film with a thickness of about 20 μm, which was cut into a disc and then placed in a solution of 85% hydrazine hydrate for one hour to obtain graphene aerogel having a height of about 8.1 mm. The graphene aerogel was soaked in ethanol to replace the foaming agent solution and then dried at 60 Celsius degrees to remove the ethanol, and was treated at a high temperature of 1600 Celsius degrees for 1 h, thereby obtaining graphene aerogel with a density of 3 mg/cm$^3$, of 0.2, and an electromagnetic shielding effectiveness of 110 dB at 5 mm.

Example 15

A suspension of graphene oxide, having a size ranging from 80 to 100 μm, a carbon to oxygen ratio of 2.35, and a concentration of 10 mg/ml, available from Hangzhou Gaoxi Co., LTD., was cast to obtain a graphene oxide film with a thickness of about 50 which was cut into a disc and then placed in an aqueous solution of 100 mg/mL ammonium bicarbonate for a while to obtain graphene aerogel having a height of about 12.6 mm. The grapheme aerogel was soaked in isopropanol to replace the foaming agent solution and then dried at 60 Celsius degrees to remove the isopropanol, and was treated at a high temperature of 1600 Celsius degrees for 1 h, thereby obtaining graphene aerogel with a density of 5 mg/cm$^3$, $I_D/I_G$ of 0.15, and an electromagnetic shielding effectiveness of 70 dB at 5 mm.

Example 16

A suspension of graphene oxide, having a size ranging from 100 to 200 μm, a carbon to oxygen ratio of 2.14, and a concentration of 10 mg/ml, available from Hangzhou Gaoxi Co., LTD., was suffered from suction filtration to obtain a graphene oxide film with a thickness of about 30 μm, which was cut into a disc and then placed in an aqueous solution of 100 mg/Ml, ammonium bicarbonate for a while to obtain graphene aerogel having a height of about 8.5 mm. The graphene aerogel was soaked in isopropanol to replace the foaming agent solution and then dried at 60 Celsius degrees to remove the isopropanol, and was treated at a high temperature of 1000 Celsius degrees for 1 h, thereby obtaining graphene aerogel with a density of 5.3 mg/cm$^3$, $I_D/I_G$ of 0.1, and an electromagnetic shielding effectiveness of 102 dB at 5 mm.

Comparative Example 1

A suspension of graphene oxide, having a size ranging from 20 to 30 μm, a carbon to oxygen ratio of 2.5, and a concentration of 5 mg/ml, available from Hangzhou Gaoxi Co., LTD., was cast to obtain a graphene oxide film with a thickness of about 20 μm, which was cut into a disc (the same as Example 14) and was directly treated at a high temperature of 1600 Celsius degrees for 1 h, thereby obtaining porous graphene film with a density of 100 mg/cms, $I_D/I_G$ of 0.2, and an electromagnetic shielding effectiveness of 20 dB.

Comparative Example 2

Ammonium bicarbonate was added into a suspension of graphene oxide, having a size ranging from 80 to 100 μm, a carbon to oxygen ratio of 2.35, and a concentration of 10 mg/ml, available from Hangzhou Gaoxi Co., LTD., and the resulted mixture was cast to obtain a graphene oxide film with a thickness of about 50 μm, which was cut into a disc and subjected to decomposition of the ammonium bicarbonate at 200 Celsius degrees to foam the graphene film. The resulted foamed material has a large number of discrete pores.

What is claimed is:

1. A method for preparing an aerogel material, wherein the method is realized based on plasticizing and foaming with solvent and comprises:
   placing a macroscopical material formed by stacking and assembling layers of graphene oxide in a plastic solution containing a foaming agent for plasticizing and foaming, and drying to obtain a porous graphene aerogel material; wherein
   the foaming agent comprises a spontaneous foaming agent and a reactive foaming agent, wherein the reactive foaming agent is a foaming agent that can generate gas by reacting with the graphene oxide to be foamed, and the spontaneous foaming agent is a foaming agent that can be decomposed to generate gas; and
   the reactive foaming agent comprises hydrazine hydrate or borohydride salt, and the spontaneous foaming agent comprises bicarbonate.

2. The method according to claim 1, wherein the plastic solution is a plasticizer or a solution containing the plasticizer, and the plasticizer is a substance which can reduce an intermolecular force of the graphene oxide to be foamed.

3. The method according to claim 1, wherein the plastic solution is water, organic solvent, or a mixture of water and organic solvent.

4. The method according to claim 3, wherein the organic solvent is selected from the group consisting of dimethylformamide, dimethylacetamide, isopropanol, ethanol.

5. The method according to claim 3, wherein the graphene oxide has a size greater than or equal to 1 μm.

6. The method according to claim 1, wherein the drying comprises at least one of direct drying and solvent-displacement drying.

* * * * *